UNITED STATES PATENT OFFICE.

DAVID H. PIFFARD, OF PIFFARD, NEW YORK.

COMPOSITION OF MATTER FOR INSULATING PURPOSES.

SPECIFICATION forming part of Letters Patent No. 467,520, dated January 26, 1892.

Application filed May 26, 1891. Serial No. 394,192. (No specimens.)

*To all whom it may concern:*

Be it known that I, DAVID H. PIFFARD, a citizen of the United States, and a resident of Piffard, in the county of Livingston and State of New York, have invented a certain new and useful Composition of Matter for Insulating Purposes, of which the following is a specification.

My invention consists of a novel composition of matter embodying as its constituents, first, rubber; second, rosin, and, third, plaster-of-paris, ground clay, or similar absorbent non-conducting material, such as a non-conducting mineral substance reduced to a powdered or finely-divided state, combined in about the proportins hereinafter specified.

The object of my invention is to provide a cheap and effective substitute for rubber and similar materials used as insulators of electricity and at the same time one which shall be of a tough horny nature, impervious to moisture, insoluble in water, not readily attacked by steam or acids, and which shall adhere firmly to glass and similar materials having a smooth polished surface.

My improved composition finds its chief utility as a protective insulating sheath, filling, or coating for electrical apparatus, appliances, or conductors where it is desirable to form a water-tight seal or an adherent coating in situations when the substance would be exposed to the action of steam, moisture, acid, or other vapors accompanied frequently by high temperature which would soften material sometimes employed heretofore, such, for instance, as shellac. The substance forms also an effective substitute for sulphur, plaster-of-paris, and such like substances employed in connection with insulators for electric-line wire, necks of incandescent lamps, &c., being impervious to moisture and at the same time having a rate of expansion and contraction approximately the same as that of glass and closely adherent thereto. The composition will also stand a comparatively high degree of heat without softening.

My improved composition is made as follows: To five pounds of soft rubber take about twenty-four pounds of rosin and mix together thoroughly by heating and stirring. It is desirable to continue the heating until the more readily volatilizable parts of the rosin are driven off by the heat. To the mixture add about twenty-six pounds of plaster-of-paris well dried, or ground clay or similar absorbent non-conducting substance, as described, mixing the same well in. This composition can then be applied as an adherent substance while hot or can be allowed to cool and then reheated for the purpose.

I do not limit myself to the exact proportions of ingredients heretofore specified, and the proportions may be considerably varied without departing from my invention.

What I claim as my invention is—

A composition of matter for insulating purposes, consisting of rubber, rosin, and plaster-of-paris or its equivalent, as described, in the proportions, by weight, of five rubber, twenty-four rosin, and twenty-six plaster-of-paris, more or less, as described.

Signed at Geneseo, in the county of Livingston and State of New York, this 20th day of May, A. D. 1891.

DAVID H. PIFFARD.

Witnesses:
GEO. B. ADAMS,
ROBT. LAUDERDALE.